UNITED STATES PATENT OFFICE.

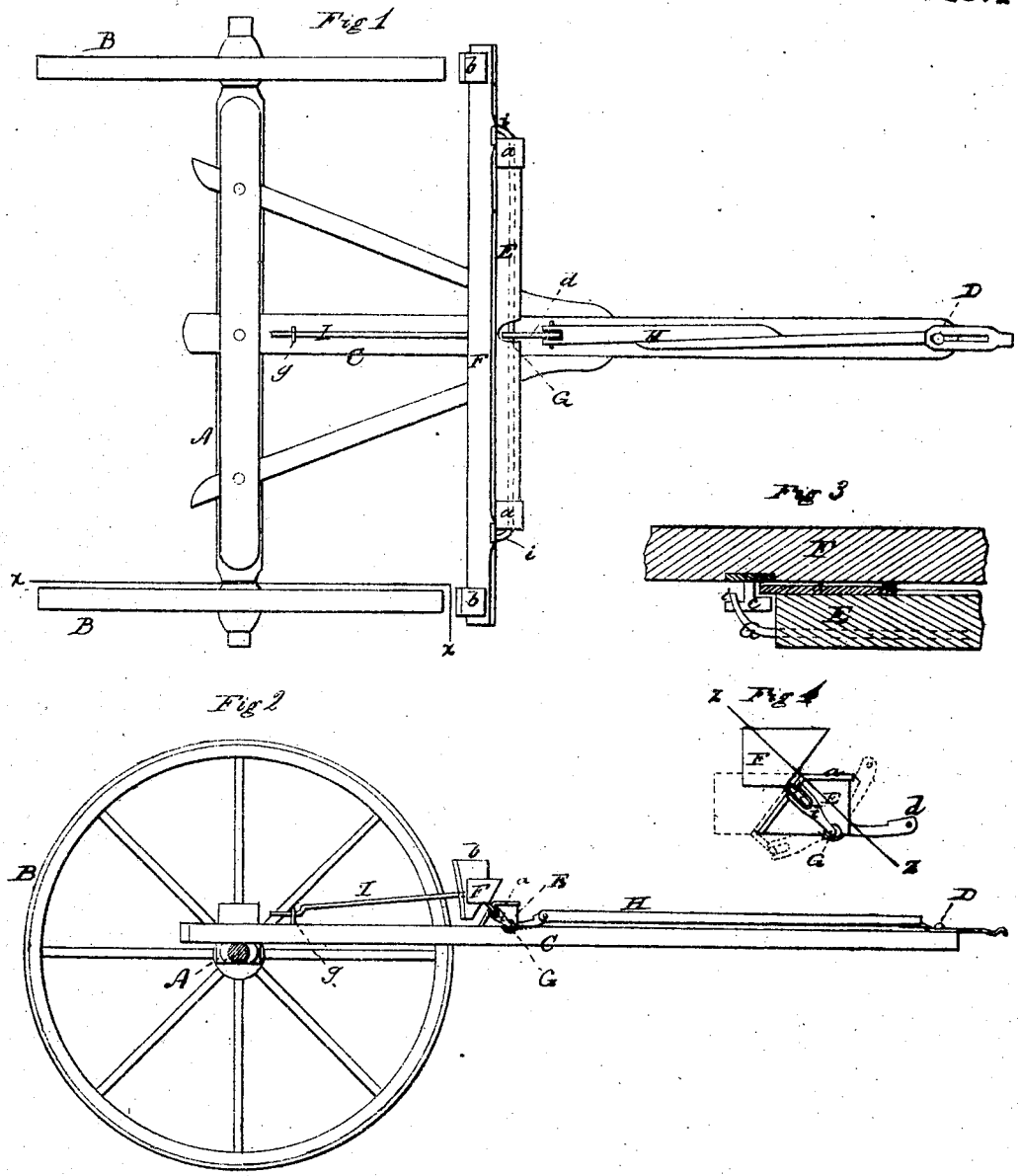

DORUS HEALY, OF SOUTH DANVILLE, NEW YORK.

IMPROVEMENT IN WAGON-BRAKES.

Specification forming part of Letters Patent No. 116,957, dated July 11, 1871.

*To all whom it may concern:*

Be it known that I, DORUS HEALY, of South Danville, in the county of Steuben and State of New York, have invented certain Improvements in Wagon-Brakes, of which the following is a specification, reference being had to the accompanying drawing.

My invention consists in a novel arrangement of devices, whereby the forward and backward strain on the wagon-tongue serves to apply and remove the brake, so that when the team holds back, as in descending an incline, the brakes are automatically applied, and automatically removed when the team draws forward again.

Figure 1 is a top-plan view of the rear portion of an ordinary wagon having my brake applied thereto. Fig. 2 is a longitudinal section through the same on the line $x\,x$ of Fig. 1. Fig. 3 is a longitudinal section through the brake-bar and its support, and Fig. 4 is an end view of the same.

In the drawing, A represents the rear axle; B, the rear wheels; C, the reach; and D, the king-bolt of an ordinary wagon. In applying my brake thereto I first secure rigidly to the reach C, just forward of the rear wheels, a horizontal cross-bar, E, having its rear face inclined downward and backward, as shown in Figs. 1, 2, and 4. On each end of this bar I secure a plate, $a$, extending across the top and down the inclined side of the bar, and projecting slightly beyond the end of the same, as shown in Figs. 3 and 4. I next provide a brake-bar, F, having the rub-blocks or shoes secured to its ends, and having its front side inclined to correspond with the inclined side of the rigid bar E. To the front side of the brake-bar F, near each end, I secure a projecting T-shaped block or stud, $c$, as shown in Fig. 3, and to its rear side, at the middle, I secure a rigid rod, I, as shown in Figs. 1 and 2. I then mount the brake-bar against the rear inclined face of the bar E with the blocks $c$, clasping over the projecting edges of plate $a$, as shown in Figs. 3 and 4, and with the rear end of rod I resting loosely in an eye or staple, $g$, on the reach, as shown in Figs. 1 and 2. In a groove in the under side of the rigid bar E I mount a rock-shaft, G, having its ends $i$ bent at right angles and forked so as to embrace the respective blocks $c$, as shown in all the figures. To the middle of the rock-shaft I secure an arm, $d$, and to this arm I connect a bar, H, which extends forward along the reach, and is provided at its front end with a slot, through which the king-bolt D passes, as shown in Figs. 1 and 2. The tongue of the wagon I arrange in the manner common in all this class of brakes, so as to have a slight longitudinal movement, and to it I connect in any suitable manner the front end of the bar H. When the team holds back on the tongue it slides backward, and carries with it the bar H, which in turn pushes up the arm $d$ and turns the shaft G. The forked ends $i$ of the shaft being thus turned down, they push down the blocks $c$ and slide the brake-bar F down the inclined face of bar E, so as to force the hub-blocks on the latter against the wheels, the wheels turning forward to pull the brake-bar down so that it wedges in against the inclined face of bar E and bears with very great force against the wheels. When the team draws forward on the tongue it pulls the bar H forward, and the bar turns the arm $d$ down, and thereby turns shaft G, so as to bring its arms up and raise the brake-bar up the inclined face away from the wheels. The blocks $c$, clasping over the plates $a$, serve to hold the brake-bar in place and to draw it forward when raised, and the rod I serves to prevent the brake-bar from turning over, as it might otherwise do.

Having thus described my invention, what I claim is—

1. The combination of the bar F, having the rod I attached, with the bar E, rock-shaft G with its arms $i\,d$, and rod H, constructed and arranged to operate substantially as described.

2. The plates $a$ attached to the bar E, in combination with the T-shaped lugs $c$ attached to the sliding bar F for holding the latter in place and guiding it in its movements, as set forth.

DORUS HEALY.

Witnesses:
    HENRY R. LOVELL,
    WILLIAM D. LEWIS.